United States Patent
Matsushita (10) Patent No.: US 11,803,346 B2
(45) Date of Patent: Oct. 31, 2023

(54) DISPLAY DEVICE AND METHOD FOR CONTROLLING DISPLAY DEVICE

(71) Applicant: Sharp NEC Display Solutions, Ltd., Tokyo (JP)

(72) Inventor: Hiroaki Matsushita, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 17/704,875

(22) Filed: Mar. 25, 2022

(65) Prior Publication Data
US 2022/0214851 A1 Jul. 7, 2022

Related U.S. Application Data

(63) Continuation of application No. PCT/JP2019/038545, filed on Sep. 30, 2019.

(51) Int. Cl.
G06F 3/14 (2006.01)
H04N 7/01 (2006.01)

(52) U.S. Cl.
CPC ......... *G06F 3/1431* (2013.01); *H04N 7/0127* (2013.01); *H04N 7/0117* (2013.01)

(58) Field of Classification Search
CPC ... G06F 3/1431; H04N 7/0127; H04N 7/0117
See application file for complete search history.

(56) References Cited

U.S. PATENT DOCUMENTS

2003/0227423 A1 12/2003 Arai et al.
2009/0109334 A1* 4/2009 Murakami ............. H04N 5/268
348/E5.009

(Continued)

FOREIGN PATENT DOCUMENTS

JP H11-234595 A 8/1999
JP 2004-029434 A 1/2004
(Continued)

OTHER PUBLICATIONS

International Search Report (ISR) (PCT Form PCT/ISA/210), in PCT/JP2019/038545, dated Dec. 24, 2019.

*Primary Examiner* — Abbas I Abdulselam
(74) *Attorney, Agent, or Firm* — McGinn IP Law Group, PLLC (57) ABSTRACT

A display device includes: a reception unit to receive a video signal input from an external output correspondence input terminal and a timing signal corresponding to the video signal; a video processing unit to perform processing on a video signal input from an external output non-correspondence input terminal and the video signal, acquired from the reception unit, input from the external output correspondence input terminal; and a control unit to acquire the timing signal supplied from the reception unit as a timing signal corresponding to a video signal of non-display in a state that a displayed video is based on the video signal input from the external output non-correspondence input terminal, and the video signal of non-display input from the external output correspondence input terminal at that time is acquired by the reception unit in a case of performing a process of a high-speed input switching function for switching between the video signal input from the external output non-correspondence input terminal and the video signal input from the external output correspondence input terminal.

10 Claims, 9 Drawing Sheets

(56) References Cited

U.S. PATENT DOCUMENTS

2009/0276727 A1    11/2009  Ouchi
2019/0174181 A1*   6/2019   Kondo .................. H04N 23/60
2021/0360191 A1*   11/2021  Wei ....................... G06T 3/4007

FOREIGN PATENT DOCUMENTS

| JP | 2006-038981 A | 2/2006 |
| JP | 2008-172346 A | 7/2008 |
| JP | 2009-037207 A | 2/2009 |
| JP | 2009-111555 A | 5/2009 |
| JP | 2013-109226 A | 6/2013 |
| JP | 2017-169038 A | 9/2017 |

* cited by examiner

DISPLAY DEVICE AND METHOD FOR CONTROLLING DISPLAY DEVICE

TECHNICAL FIELD

The present invention relates to a display device and a method for controlling a display device.

BACKGROUND ART

A high-speed input switching function of a display device is for performing input switching at a high speed by taking in video signals of two inputs, displaying a screen of one input, setting a screen of the other input to be not displayed, and performing switching between the displayed screen and the not-displayed screen using a screen composition technology. In other words, in a two-screen display such as picture in picture (PinP), video signals of two inputs are taken into a memory, one input is displayed on a main screen, and the other input is displayed while reduced in size as a sub screen and is combined with the main screen. Here, for example, by setting the sub screen to be not displayed and interchanging the main screen and the sub screen, high-speed input switching can be performed.

In addition, a display device configuring a multiple displays by aligning a plurality of the display devices has a function of being able to output an input video signal to a display device of a next stage through relay. In other words, an external output non-correspondence video input terminal, an external output correspondence video input terminal, and a video output terminal are disposed in such a display device. In addition, in such a display device, a reception unit used for switching of a video signal from another video input terminal and supporting output of a video to the outside is disposed. In a case in which a display device is independently used, a video signal does not need to be transmitted to another display device, and thus an external output non-correspondence video input terminal is used. In a case in which a multiple-display is configured, a video signal from the previous stage is input to an external output correspondence video input terminal. Then, the mode of the reception unit is set to a mode for relaying a video signal, and a video signal from the previous stage is output from a video output terminal through the reception unit and is transmitted to a display device of the next stage.

In addition, Patent Literature 1 states that, in an environment in which a plurality of display devices are connected, display timings of a plurality of connected monitors are synchronized with other when switching between sources is performed.

CITATION LIST

Patent Literature 1

Japanese Unexamined Patent Application, First Publication No. H11-234595

SUMMARY OF INVENTION

Technical Problem

As described above, in a display device having a function of being able to output an input video signal to a display device of the next stage through relay, an external output non-correspondence video input terminal and an external output correspondence video input terminal are disposed. In such a display device, when switching between a video signal from the external output non-correspondence video input terminal and a video signal from the external output correspondence video input terminal is performed using the technology of the high-speed input switching function described above, there is a problem in that a deviation in timing temporarily occurs.

In other words, an external output correspondence video signal is input through the reception unit used for switching between video signals and supporting output of a video to the outside. When a video signal is input from the external output non-correspondence input terminal, the reception unit is set to a mode in which a video signal is not output from the video output terminal. When the input is switched from the external output non-correspondence input terminal to the external output correspondence input terminal, the reception unit is switched to a mode in which a video signal is output from the external output terminal. At this time, the reception unit temporarily stops output of a signal at the time of mode switching. In accordance with this, a deviation in timing occurs.

In view of the problems described above, an object of the present invention is to provide a display device and a method for controlling a display device preventing occurrence of disturbance in timing at the time of performing input switching using a high-speed input switching function.

Solution to Problem

A display device according to one aspect of the present invention includes: a reception unit configured to receive a video signal input from an external output correspondence input terminal and a timing signal corresponding to the video signal; a video processing unit configured to perform processing on a video signal input from an external output non-correspondence input terminal and the video signal, which has been acquired from the reception unit, and input from the external output correspondence input terminal; and a control unit configured to acquire the timing signal supplied from the reception unit as a timing signal corresponding to a video signal of non-display in a state in which a displayed video is based on the video signal input from the external output non-correspondence input terminal, and the video signal of non-display input from the external output correspondence input terminal at that time is acquired by the reception unit in a case in which a process of a high-speed input switching function for switching between the video signal input from the external output non-correspondence input terminal and the video signal input from the external output correspondence input terminal is performed.

A method for controlling a display device according to one aspect of the present invention is a method for controlling a display device including: a reception unit configured to receive a video signal input from an external output correspondence input terminal and a timing signal corresponding to the video signal; and a video processing unit configured to perform processing on a video signal input from an external output non-correspondence input terminal and the video signal, which is acquired from the reception unit, input from the external output correspondence input terminal, the method including acquiring the timing signal supplied from the reception unit as a timing signal corresponding to a video signal of non-display in a state in which a displayed video is based on the video signal input from the external output non-correspondence input terminal, the video signal of non-display input from the external output correspondence input terminal at that time being acquired by the reception unit in a case in which a process of a high-speed input switching function for switching between the video signal input from the external output non-correspondence input terminal and the video signal input from the external output correspondence input terminal is performed.

Advantageous Effects of Invention

According to the present invention, when input switching is performed using a high-speed input switching function, the process is performed on a video signal passing through a reception unit by acquiring a timing of the reception unit, whereby a disturbance of a timing at the time of high-speed input switching can be prevented.

DESCRIPTION OF EMBODIMENTS

Figure 1:
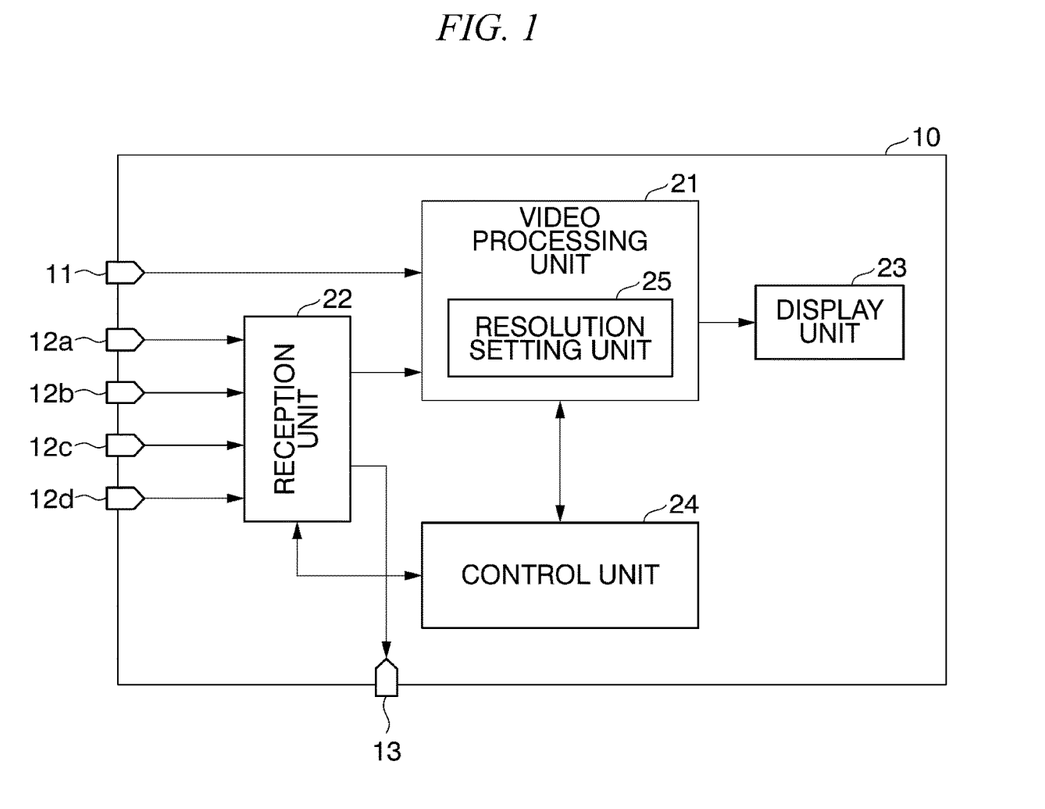
FIG. 1 is a block diagram illustrating an overview of a display device according to an embodiment of the present invention.

Hereinafter, an embodiment of the present invention will be described with reference to the drawings. FIG. 1 is a block diagram illustrating an overview of a display device 10 according to an embodiment of the present invention. As illustrated in FIG. 1, the display device 10 according to the embodiment of the present invention includes a video input terminal 11, video input terminals 12a to 12d, and a video output terminal 13. In addition, the display device 10 includes a video processing unit 21, a reception unit 22, a display unit 23, and a control unit 24.

The video input terminal 11 is an external output non-correspondence video input terminal. As the video input terminal 11, for example, an HDMI (registered trademark) 2.0 (high-definition multimedia interface 2.0) is used. A video signal input to the video input terminal 11 is transmitted to the video processing unit 21.

The video input terminals 12a to 12d are external output non-correspondence video input terminals. As the video input terminals 12a to 12d, for example, digital visual interface digital only (DVI-D) and HDMI 2.0 are used. Video signals input to the video input terminals 12a to 12d are transmitted to the reception unit 22.

The video output terminal 13 is a video output terminal that outputs video signals to other devices. For example, HDMI 2.0 is used as the video output terminal 13.

The video processing unit 21 performs various kinds of video processing on a display image such as resolution conversion, luminance adjustment, color adjustment, and the like. A video signal from the video input terminal 11 is input to the video processing unit 21, and a video signal from the reception unit 22 is input to the video processing unit 21. In addition, the video processing unit 21 includes a resolution setting unit 25. By controlling writing and reading of an image memory, the resolution setting unit 25 sets a resolution of a display image. In addition, a two-screen display such as the PinP can be performed by this resolution setting unit 25. Furthermore, image data of two screens is taken into the resolution setting unit 25, one screen is displayed, the other screen is set to be not displayed, and switching between the displayed screen and the non-display screen is performed, whereby high-speed input switching can be performed.

The reception unit 22 receives video signals from a plurality of the video input terminals 12a to 12d and performs switching and output control of the video signals. A sink mode or a repeater mode can be set in the reception unit 22. The sink mode is a mode in which the reception unit 22 is caused to operate as a signal receiver, and no video signal is output to the outside. At the time of the sink mode, the reception unit 22 outputs a video signal only to the video processing unit 21, and a video signal is not output from the video output terminal 13. The repeater mode is a mode in which the reception unit 22 is caused to operate as a relay device. In the repeater mode, the reception unit 22 outputs a video signal to the video processing unit 21 and outputs a video signal from the video output terminal 13.

The display unit 23 displays an image based on a video signal processed by the video processing unit 21. As the display unit 23, for example, a liquid crystal display (LCD) is used.

The control unit 24 performs control of the reception unit 22 and the video processing unit 21. In addition, the control unit 24 performs control of a high-speed input switching function.

The control unit 24 has a storage area in which various kinds of data can be stored therein. In addition, the storage area of the control unit 24 may be provided outside the control unit 24. Such a storage area, for example, may be realized using, for example, a storage medium such as a hard disk drive (HDD), a flash memory, an electrically erasable programmable read only memory (EEPROM), a random access read/write memory (RAM), or a read only memory (ROM) or a storage device configured by an arbitrary combination of such storage media. As this storage device, for example, a nonvolatile memory may be used.

Figure 2:
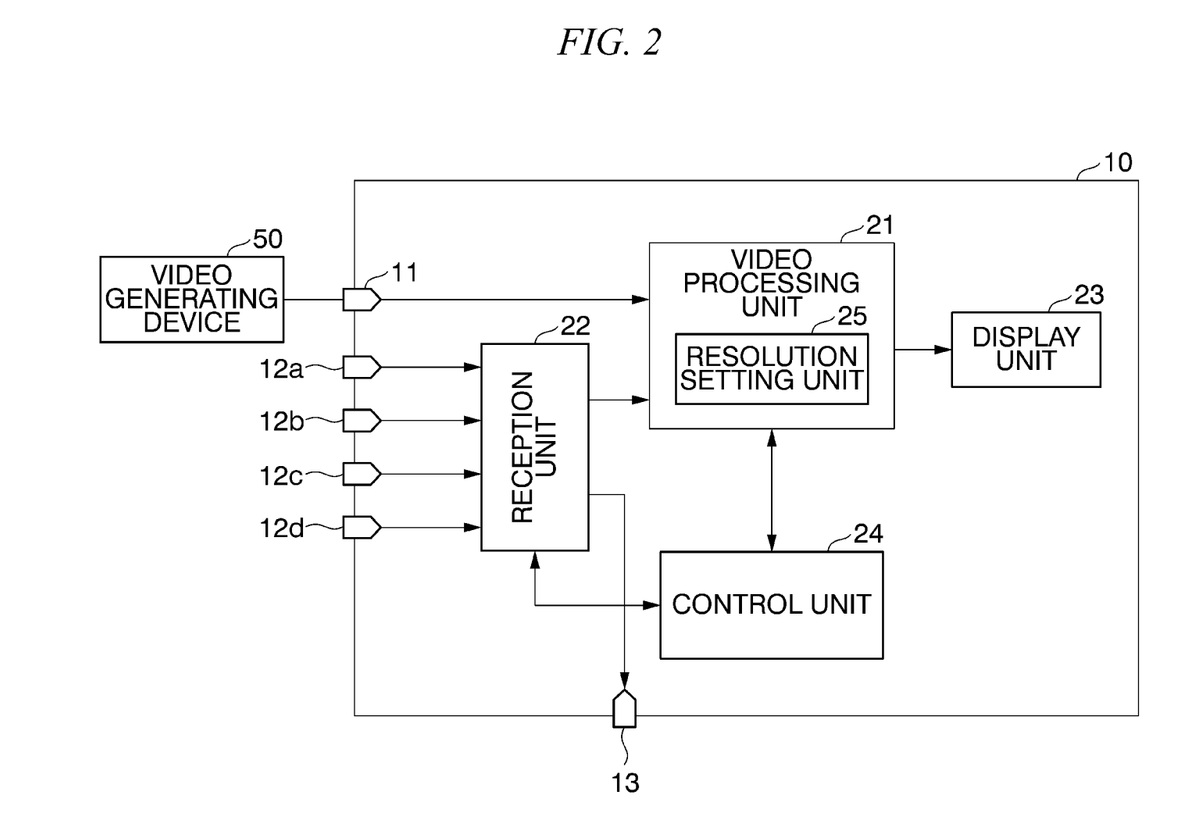
FIG. 2 is a block diagram used for describing a case in which a display device according to an embodiment of the present invention is independently used.

FIG. 2 is a block diagram used for describing a case in which the display device 10 according to the embodiment of the present invention is independently used.

In a case in which the display device 10 is independently used, the reception unit 22 is set to the sink mode. For this reason, a video signal is not output from the video output terminal 13. Then, a video generating device 50 is connected to the external output non-correspondence video input terminal 11. In accordance with this, a video signal from the video generating device 50 is transmitted to the video processing unit 21, and an image based on the video signal from the video generating device 50 is displayed on the display unit 23.

Figure 3:
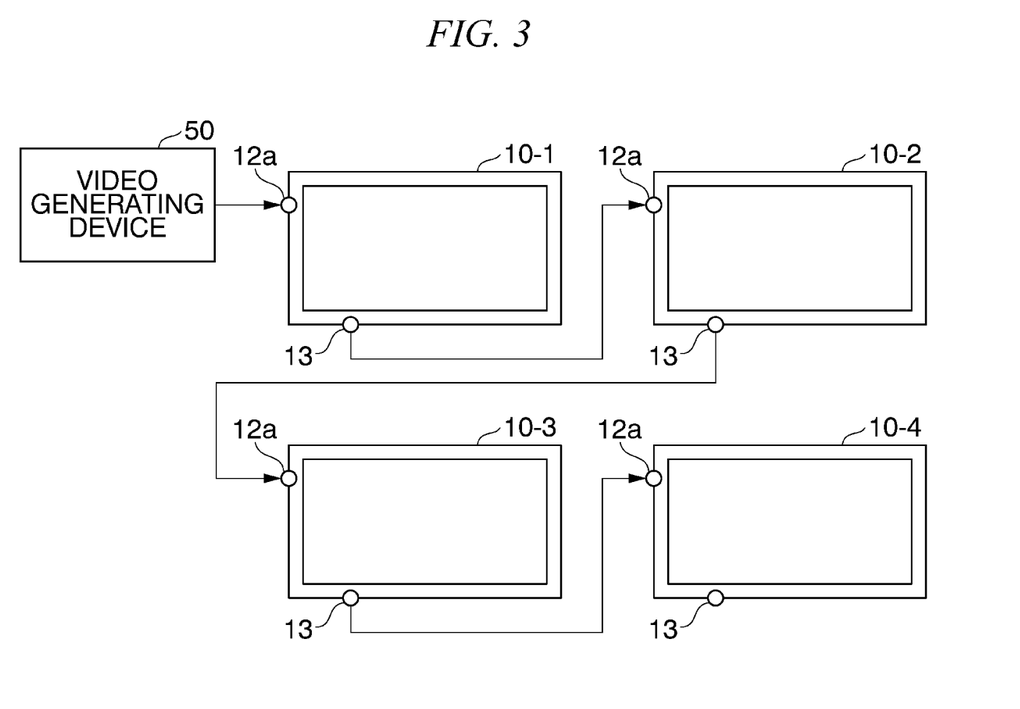
FIG. 3 is a block diagram used for describing a case in which a multiple-display system is built by connecting display devices according to an embodiment of the present invention.
Figure 4:
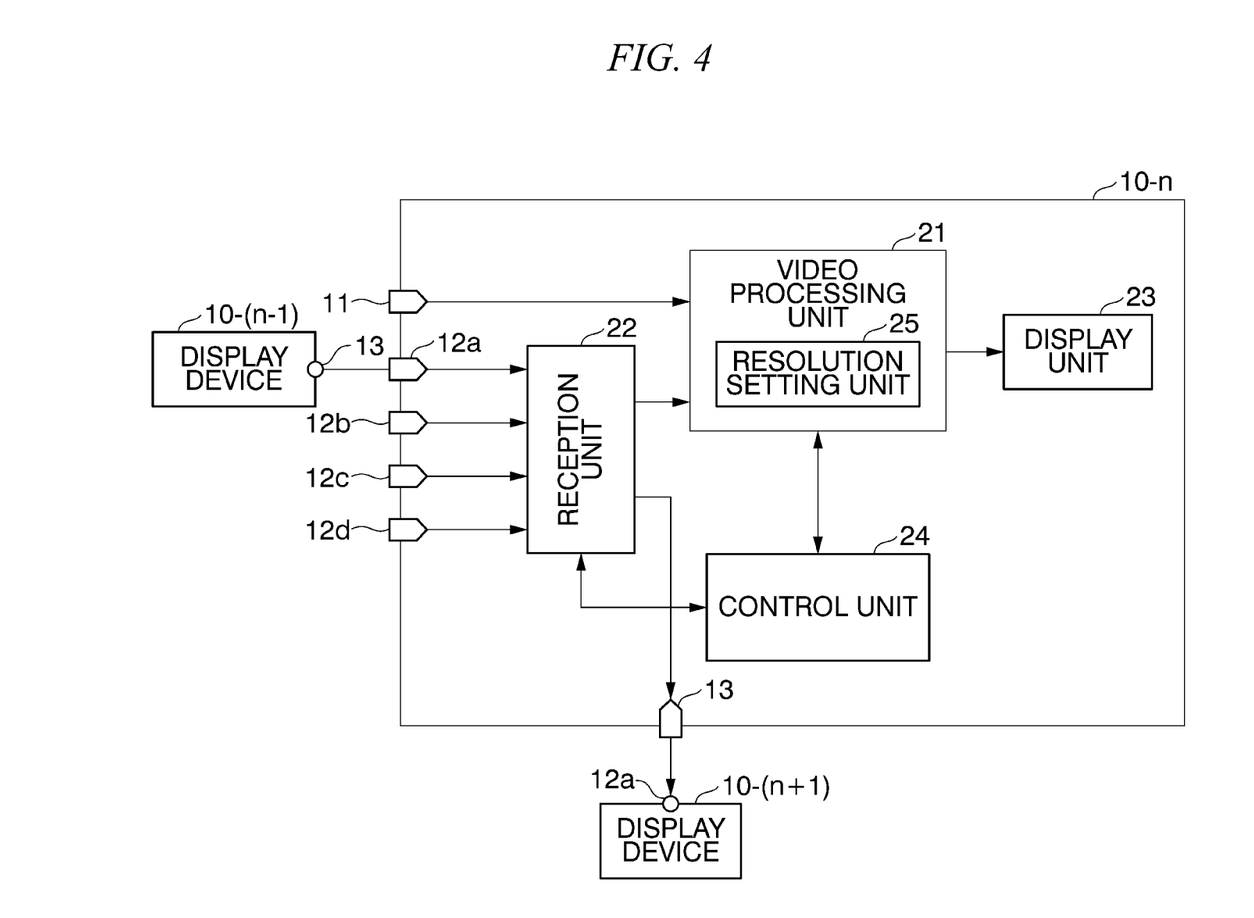
FIG. 4 is a block diagram used for describing a case in which a multiple-display system is built by connecting display devices according to an embodiment of the present invention.

FIGS. 3 and 4 are block diagrams used for describing a case in which a multiple-display system is built by connecting display devices 10-1 to 10-4 according to the embodiment of the present invention.

As illustrated in FIG. 3, in a case in which the multiple-display system is built by connecting the display devices 10-1 to 10-4, the video generating device 50 and the external output correspondence video input terminal 12a of the foremost display device 10-1 are connected. Then, from the next stage, in the display device 10-n (here, n is an integer), the video input terminal 12a thereof is connected to the video output terminal 13 of the display device 10-(n−1) of the previous stage, and the video output terminal 13 thereof is connected to the external output correspondence video input terminal 12a of the display device 10-(n+1) of the next stage. In other words, the video output terminal 13 of the display device 10-1 and the video input terminal 12a of the display device 10-2 of the next stage are connected. The video output terminal 13 of the display device 10-2 and the video input terminal 12a of the display device 10-3 of the next stage are connected. The video output terminal 13 of the display device 10-3 and the video input terminal 12a of the display device 10-4 of the next stage are connected. Here, although the video input terminal 12a is used as an external output correspondence video input terminal, any one of the video input terminals 12b to 12d that are correspondence with other external outputs may be used.

As illustrated in FIG. 4, in a case in which a multiple-display is configured using display devices according to the embodiment of the present invention, the video input terminal 12a of the display device 10-n is connected to the video output terminal 13 of the display device 10-(n−1) of the previous stage. In addition, the video output terminal 13 of the display device 10-n is connected to the video input terminal 12a of the display device 10-(n+1) of the next stage. In addition, at this time, the reception unit 22 is set to the repeater mode.

A video signal is transmitted to the video input terminal 12a from the video output terminal 13 of the display device 10-(n−1) of the previous stage. This video signal is input to the reception unit 22 of the display device 10-n. The reception unit 22 is set to the repeater mode, and thus, a video signal from the reception unit 22 is transmitted to the video processing unit 21 and is output from the video output terminal 13. In accordance with this, an image based on the video signal from the display device 10-(n−1) is displayed in the display unit 23 of the display device 10-n. In addition, a video signal from the reception unit 22 is output from the video output terminal 13 and is transmitted to the video input terminal 12a of the display device 10-(n+1) of the next stage.

In this way, the display device 10 according to the embodiment of the present invention has a function of outputting a video signal from the video output terminal 13. In this way, the display device 10 can be independently used or may be used by building a multiple-display system.

Figure 5:
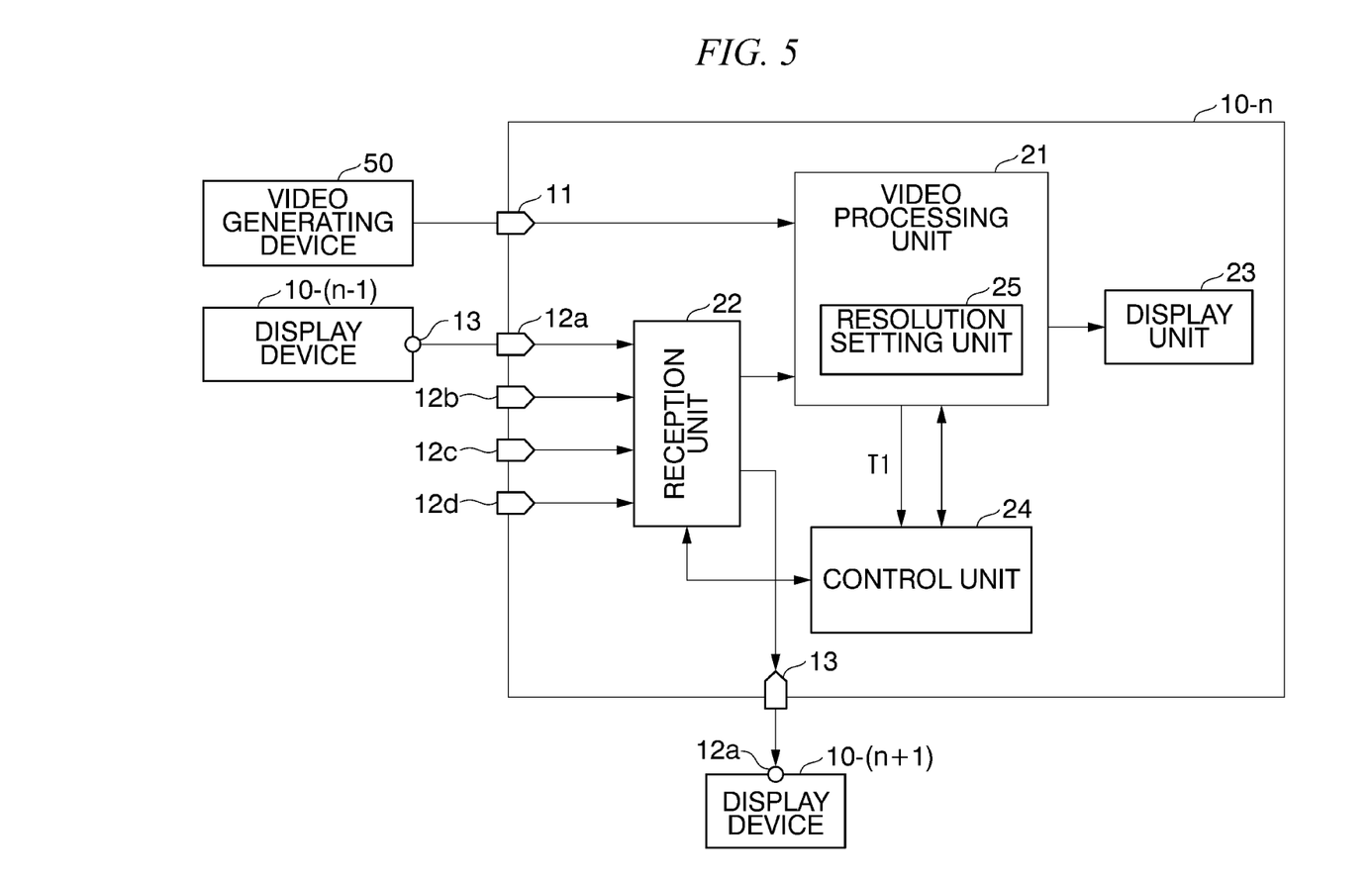
FIG. 5 is an explanatory diagram illustrating a case in which a high-speed input switching process is performed by a display device according to an embodiment of the present invention.
Figure 6:
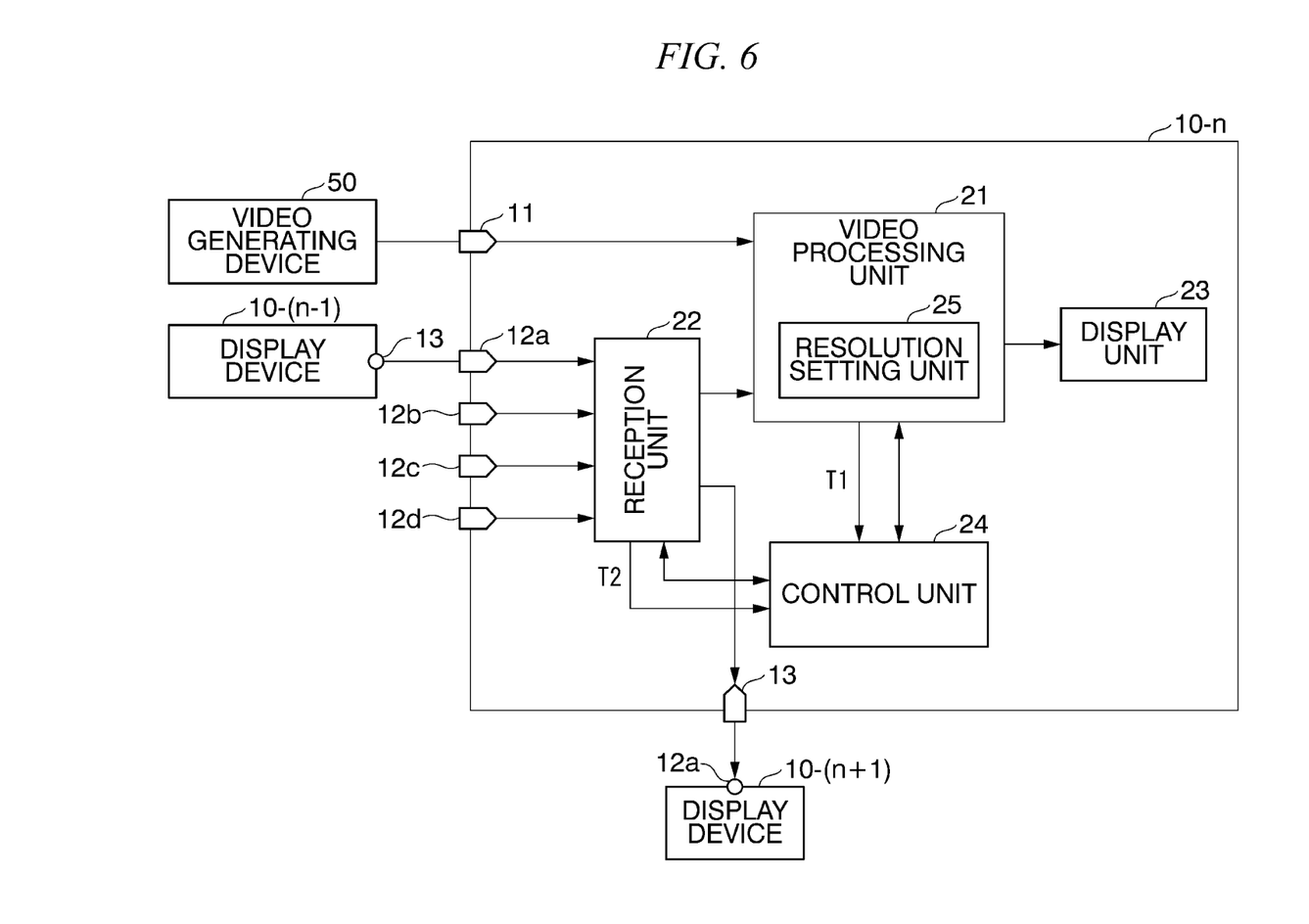
FIG. 6 is an explanatory diagram illustrating a case in which a high-speed input switching process is performed by a display device according to an embodiment of the present invention.

Next, the process of a high-speed input switching function according to the embodiment of the present invention will be described. FIGS. 5 and 6 are explanatory diagrams illustrating cases in which a high-speed input switching process is performed by the display device according to the embodiment of the present invention.

As described above, the display device 10 according to the embodiment of the present invention can receive a video signal from the external output non-correspondence video input terminal 11 as an input and display a screen on the display unit 23. In addition, the display device 10 according to the embodiment of the present invention can build a multiple-display by receiving a video signal from a display device of the previous stage to the external output correspondence video input terminals 12a to 12d as an input and outputting a video signal to a display device of the next stage from the video output terminal 13.

In the case illustrated in FIG. 5, by connecting the video generating device 50 to the external output non-correspondence video input terminal 11, a video signal from the video generating device 50 can be displayed on the display unit 23. In addition, by connecting a display device 10-(n−1) of the previous stage to the external output correspondence video input terminal 12a and connecting a display device 10-(n−1) of the next stage to the video output terminal 13, multiple-display can be built. Here, switching between a video signal from the external output non-correspondence video input terminal 11 and a video signal from the external output correspondence video input terminal 12a is performed using the high-speed input switching function.

The high-speed input switching function is realized by taking in image data of two screens (a video signal from the external output non-correspondence video input terminal 11 and a video signal from the external output correspondence video input terminal 12a) of two screens, that is, one video signal and the other video signal correspondence with image data of two screens in the resolution setting unit 25, displaying a screen of one video signal, setting a screen of the other video signal to be a non-display, and switching between the displayed screen and the non-display screen. For this reason, generally, the control unit 24 performs a process using a timing signal T1 from the resolution setting unit 25 that is synchronized with a timing of an input video signal. In other words, the timing signal T1 is input to the resolution setting unit 25 together with a video signal. The resolution setting unit 25 outputs the timing signal T1 to the control unit 24. Alternatively, the timing signal T1 is input to the resolution setting unit 25 as a signal included in a video signal. By extracting the timing signal T1 from the video signal, the resolution setting unit 25 generates the timing signal T1. The resolution setting unit 25 outputs the extracted timing signal T1 to the control unit 24. Here, the timing signal T1 is a synchronization signal for drawing a video signal (a video signal from the external output non-correspondence video input terminal 11), is composed of a vertical synchronization signal and a horizontal synchronization signal, and is a signal from which a resolution, a vertical-direction frequency, a horizontal-direction frequency, and a display type of the video signal can be acquired. The display type is signal information included in a synchronization signal representing a display method indicating whether a video signal is a signal for display using RGB (three colors) or a signal for display using color difference signals (Y/PB/PR).

However, in a case in which a video signal is input from the external output non-correspondence video input terminal 11 and is displayed on the display unit 23, the sink mode is set to the reception unit 22. In a case in which a multiple-display is built, the repeater mode is set to the reception unit 22. Thus, when the input is switched between a video signal of the external output non-correspondence video input terminal 11 and a video signal of the external output correspondence video input terminal 12a, mode switching between the sink mode and the repeater mode occurs in the reception unit 22. At this time, the reception unit 22 temporarily stops output of a signal at the time of mode switching. For this reason, the timing signal T1 from the resolution setting unit 25 is disturbed, and the control unit 24 detects an unstable signal state.

Thus, in this embodiment, as illustrated in FIG. 6, in the case of being switched to a video signal passing through the reception unit 22, the control unit 24 is configured to acquire a timing signal T2 from the reception unit 22. In other words, the timing signal T2 is input to the reception unit 22 together with a video signal. The reception unit 22 outputs the timing signal T2 to the control unit 24. Alternatively, the timing signal T2 is input to the reception unit 22 as a signal included in a video signal. By extracting the timing signal T2 from the video signal, the reception unit 22 generates the timing signal T2. The reception unit 22 outputs the extracted timing signal T2 to the control unit 24. Here, the timing signal T2 is a synchronization signal for drawing a video signal (a video signal from the external output correspondence video input terminal 12*a*), is composed of a vertical synchronization signal and a horizontal synchronization signal, and is a signal from which a resolution, a vertical-direction frequency, a horizontal-direction frequency, and a display type of a video signal can be acquired. The timing signal T2 from the reception unit 22 is a timing signal output from a signal source and thus is stable regardless of a change in the mode of the reception unit 22. For this reason, when the high-speed input switching function is controlled using the timing signal T2, a stable process can be performed even when the mode of the reception unit 22 is switched.

Figure 7:
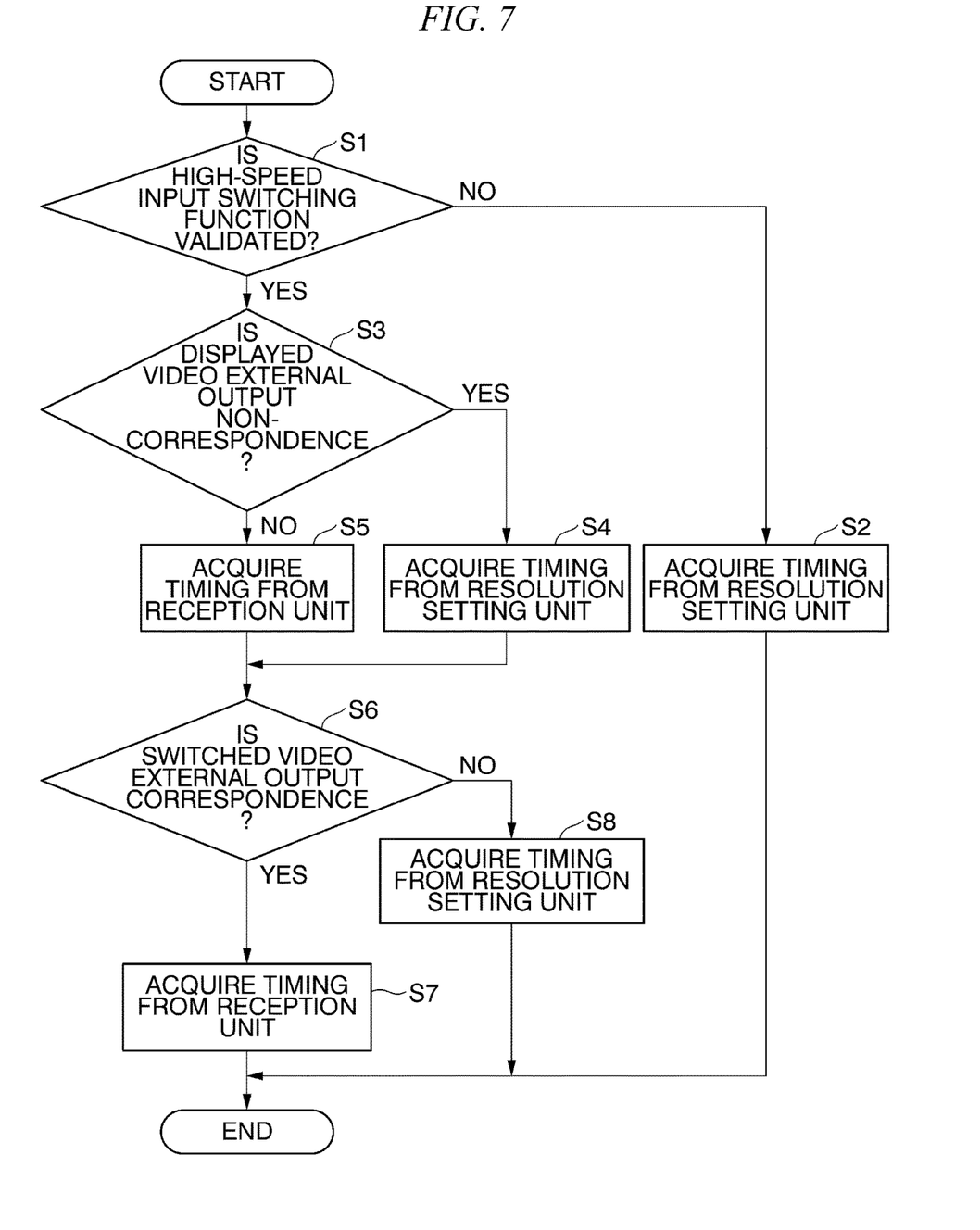
FIG. 7 is a flowchart illustrating a high-speed input switching process according to an embodiment of the present invention.

FIG. 7 is a flowchart illustrating the high-speed input switching process according to the embodiment of the present invention.

The flowchart illustrated in FIG. 7 may be executed with an arbitrary period timing (for example, once per second). Alternatively, since a timing signal is acquired for drawing a video signal (for example, once per 50 milliseconds), the flowchart illustrated in FIG. 7 may be executed together with a flow for acquiring a timing signal.

The flowchart illustrated in FIG. 7 is executed once per second on the background.

On the other hand, a user is not aware of switching of an input change super function (the high-speed input switching function) between validity/invalidity at a certain timing. At the same time, a user can freely set signals that are a front signal ("a displayed video" in the following flow) and a back signal ("a video to be switched to in the following flow). For example, a user can freely select the signals on an on-screen display (OSD) screen of a monitor (the display device).

During this time, the flowchart illustrated in FIG. 7 is executed once per second.

In addition, for performing high-speed switching in a state in which the input change super function is validated, a button for high-speed switching corresponding to the input change super function is prepared in a remote controller. A user selects a terminal corresponding to the front signal or the back signal by selecting the front signal or the back signal set on the OSD screen and pressing a button. In other words, a user may select the front signal or may select the back signal.

In this way, a target for the input change super function is the front signal or the back signal, and the front signal or the back signal is set on a separate OSD screen.

In addition, switching of display is performed last in a situation in which all the conditions for selecting the timing signal T1 or T2 are satisfied in the flowchart illustrated in FIG. 7. Thus, a relationship and an order are formed such that, after execution of the flowchart illustrated in FIG. 7, the front signal can be switched to the back signal at a high speed.

(Step S1) The control unit 24 determines whether or not the high-speed input switching function is validated. In a case in which the high-speed input switching function is not validated (Step S1: No), the control unit 24 causes the process to proceed to Step S2. On the other hand, in a case in which the high-speed input switching function is validated (Step S1: Yes), the control unit 24 causes the process to proceed to Step S3.

(Step S2) The control unit 24 acquires a timing signal T1 from the resolution setting unit 25 side and ends the process.

(Step S3) The control unit 24 determines whether or not a video displayed on the display unit 23 is a video of the external output non-correspondence input terminal. In a case in which the video displayed on the display unit 23 is a video of the external output non-correspondence input terminal (Step S3: Yes), the control unit 24 causes the process to proceed to Step S4. In a case in which the video displayed on the display unit 23 is a video of the external output correspondence input terminal (Step S3: No), the control unit 24 causes the process to proceed to Step S5.

(Step S4) In a case in which it is determined that the video displayed on the display unit 23 is a video of the external output non-correspondence input terminal in Step S3 (Step S3: Yes), the video signal has not passed through the reception unit 22, and thus the control unit 24 acquires a timing signal T1 from the resolution setting unit 25 side and causes the process to proceed to Step S6.

(Step S5) In a case in which it is determined that the video displayed on the display unit 23 is not a video of the external output non-correspondence input terminal in Step S3 (Step S3: No), the displayed video is a video signal passing through the reception unit 22, and thus the control unit 24 acquires a timing signal T2 from the reception unit 22 side and causes the process to proceed to Step S6.

(Step S6) The control unit 24 determines whether or not a video for which input switching is performed is a video of the external output correspondence input terminal. In a case in which the video for which input switching is performed is a video of the external output correspondence input terminal (Step S6: Yes), the control unit 24 causes the process to proceed to Step S7. In a case in which the video for which input switching is performed is not a video of the external output correspondence input terminal (Step S6: No), the control unit 24 causes the process to proceed to Step S8.

(Step S7) In a case in which it is determined that the video for which input switching is performed is a video of the external output correspondence input terminal in Step S6 (Step S6: Yes), the video signal has passed through the reception unit 22, and thus the control unit 24 acquires a timing signal T2 from the reception unit 22 side.

(Step S8) In a case in which it is determined that the video for which input switching is performed is not a video of the external output correspondence input terminal in Step S6 (Step S6: No), the video signal has not passed through the reception unit 22, and thus the control unit 24 acquires a timing signal T1 from the resolution setting unit 25 side.

In this way, in this embodiment, in a case in which the video signal at the time of performing input video switching is a video signal passing through the reception unit 22, the control unit 24 acquires the timing signal T2 from the reception unit 22 side and performs the process. In accordance with this, when switching between a video signal from the external output non-correspondence video input terminal and a video signal from the external output correspondence video input terminal is performed, a deviation in the timing does not occur.

In other words, switching between a video signal from the external output non-correspondence video input terminal 11 and a video signal from the external output correspondence video input terminal 12a can be performed using the high-speed input switching function. In this case, the processes of Steps S1, S3, S4, S6, and S7 are performed, and the control unit 24 acquires a timing signal T2 from the reception unit 22 side in accordance with determination results acquired in Steps S3 and S6 and performs high-speed input switching.

In other words, in a state in which the displayed video is a video signal input from the external output non-correspondence video input terminal 11 (the result of Step S3), and a video signal of non-display input from the external output correspondence video input terminal 12a has been acquired by the reception unit 22 (the result of Step S6) at that time, the control unit 24 acquires a timing signal T2 supplied from the reception unit 22 as a timing signal corresponding to the video signal of non-display (Step S7).

Then, the control unit 24 causes the video signal of non-display input from the external output correspondence video input terminal 12a to be drawn, in other words, sets a video signal of non-display to a video signal of display (a video signal to be displayed) by controlling the video processing unit 21 on the basis of the acquired timing signal T2.

In accordance with this, when switching between a video signal from the external output non-correspondence video input terminal and a video signal from the external output correspondence video input terminal is performed, an unstable signal state in which a deviation in the timing occurs can be avoided, and input switching can be performed at a high speed.

In addition, since information of a resolution and a frequency is necessary for adjustment of a viewing angle of an output signal at the time of displaying the output signal on a panel (the display unit 23), the video processing unit 21 that performs screen display at the current time point acquires a timing signal T1 from a scaler (the resolution setting unit 25) in Step S4.

Furthermore, switching between a video signal from the external output correspondence video input terminal 12a and a video signal from the external output non-correspondence video input terminal 11 can be performed using the high-speed input switching function. In this case, the processes of Steps S1, S3, S5, S6, and S8 are performed, and the control unit 24 acquires a timing signal T1 from the resolution setting unit 25 in accordance with determination results acquired in Steps S3 and S6 and performs high-speed input switching.

In other words, in a state in which the displayed video is a video signal input from the external output correspondence video input terminal 12a (the result of Step S3), and a video signal of non-display input from the external output non-correspondence video input terminal 11 has been acquired by the resolution setting unit 25 (the result of Step S6) at that time, the control unit 24 acquires a timing signal T1 supplied from the resolution setting unit 25 as a timing signal corresponding to the video signal of non-display (Step S8).

Then, the control unit 24 causes the video signal of non-display input from the external output non-correspondence video input terminal 11 to be drawn, in other words, sets a video signal of non-display to a video signal of display (a video signal to be displayed) by controlling the video processing unit 21 on the basis of the acquired timing signal T1.

In this case, when switching between a video signal from the external output non-correspondence video input terminal and a video signal from the external output correspondence video input terminal is performed, an unstable signal state in which a deviation in the timing occurs can be avoided, and input switching can be performed at a high speed, and the flowchart illustrated in FIG. 7 is a flowchart for operating a product.

In other words, the flowchart illustrated in FIG. 7 is a flowchart in which determination can be performed in one flowchart even when any one of a video signal input from the external output correspondence video input terminal 12a and a video signal input from external output non-correspondence video input terminal 11 is displayed as a front signal, and a timing signal that is necessary for a back signal can be acquired.

Figure 8:
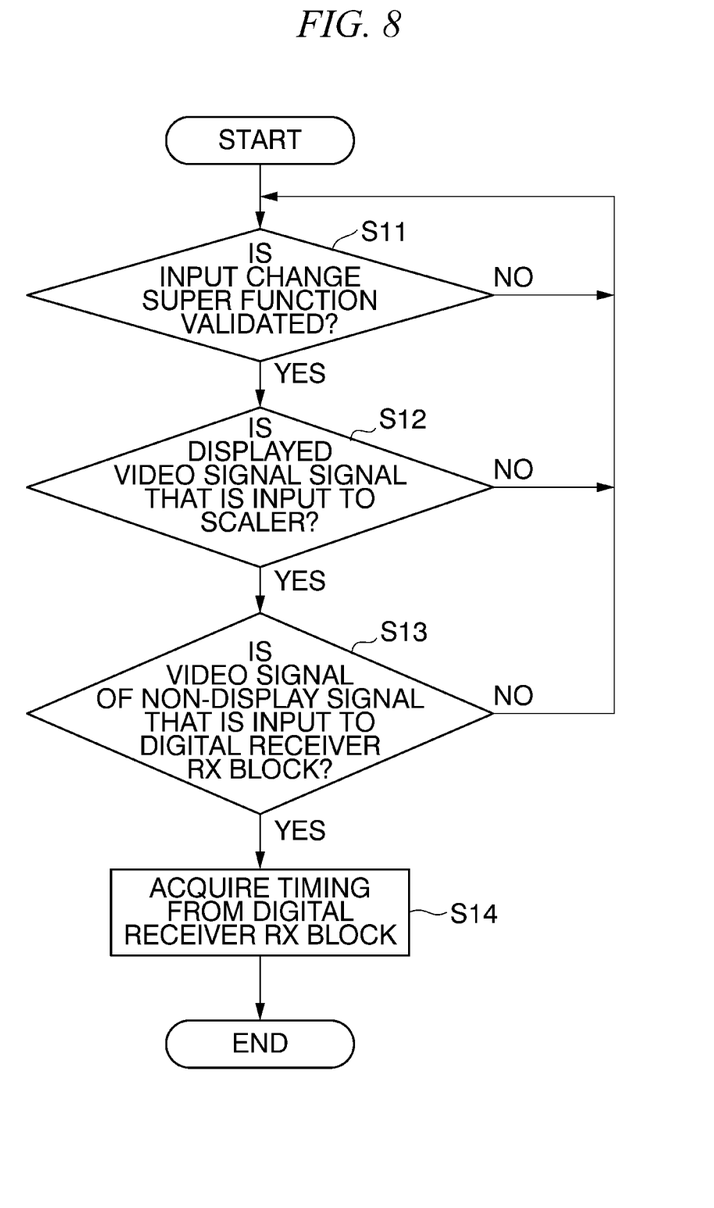
FIG. 8 is a flowchart illustrating another example of a high-speed input switching process according to an embodiment of the present invention.

FIG. 8 is a flowchart illustrating another example of a high-speed input switching process according to the embodiment of the present invention.

FIG. 8 is a flowchart that mainly represents the process performed by the control unit 24 in a case in which a displayed video is a video signal input from the external output non-correspondence video input terminal 11, and a video to be switched to is a video signal input from the external output correspondence video input terminal 12a.

(Step S11) It is determined whether or not the input change super function is validated.

More specifically, the control unit 24 determines whether or not the high-speed input switching function is validated.

In a case in which the high-speed input switching function is not validated (Step S11: No), the control unit 24 repeatedly performs the process of Step S11. In a case in which the high-speed input switching function is validated (Step S11: Yes), the control unit 24 causes the process to proceed to Step S12.

(Step S12) It is determined whether or not a displayed video signal is a signal input to the scaler.

More specifically, the control unit 24 determines whether or not the displayed video is a video signal input from the external output non-correspondence video input terminal 11 and is a signal input to the resolution setting unit 25.

In a case in which the displayed video is a video signal input from the external output correspondence video input terminal 12a and is a signal input to the reception unit 22 (Step S12: No), the control unit 24 causes the process to proceed to Step S11. On the other hand, in a case in which the displayed video is a video signal input from the external output non-correspondence video input terminal 11 and is a signal input to the resolution setting unit 25 (Step S12: Yes), the control unit 24 causes the process to proceed to Step S13.

(Step S13) It is determined whether or not a video signal of non-display is a signal input to a digital receiver RX block.

More specifically, the control unit 24 determines whether or not a video to be switched to is a video signal input from the external output correspondence video input terminal 12a and is a signal input to the reception unit 22.

In a case in which a video to be switched to is a video signal input from the external output non-correspondence video input terminal 11 and is a signal input to the resolution setting unit 25 (Step S13: No), the control unit 24 causes the process to proceed to Step S11. On the other hand, in a case in which the displayed video is a video signal input from the external output correspondence video input terminal 12a and is a signal input to the reception unit 22 (Step S13: Yes), the control unit 24 causes the process to proceed to Step S14.

(Step S14) A timing signal is acquired from the digital receiver RX block.

More specifically, the control unit 24 acquires the timing signal T2 supplied from the reception unit 22 as a timing signal corresponding to the video signal input from the external output non-correspondence video input terminal 11.

In this way, in this embodiment, in a case in which a video signal at the time of performing input video switching is a video signal passing through the reception unit 22, the control unit 24 acquires the timing signal T2 from the reception unit 22 side and performs the process. In accordance with this, when switching between a video signal from the external output non-correspondence video input terminal and a video signal from the external output correspondence video input terminal is performed, a deviation in the timing does not occur.

In other words, switching between a video signal from the external output non-correspondence video input terminal 11 and a video signal from the external output correspondence video input terminal 12a can be performed using the high-speed input switching function. In this case, the processes of Steps S11, S12, S13, and S14 are performed, and the control unit 24 acquires the timing signal T2 of the reception unit 22 side in accordance with determination results acquired in Steps S12 and S13 and performs high-speed input switching.

In other words, in a state in which the displayed video is a video signal input from the external output non-correspondence video input terminal 11 (the result of Step S12), and a video signal of non-display input from the external output correspondence video input terminal 12a has been acquired by the reception unit 22 (the result of Step S13) at that time, the timing signal T2 supplied from the reception unit 22 is acquired as a timing signal corresponding to the video signal of non-display (Step S14).

Then, the control unit 24 causes the video signal of non-display input from the external output correspondence video input terminal 12a to be drawn, in other words, sets a video signal of non-display to a video signal of display (a video signal to be displayed) by controlling the video processing unit 21 on the basis of the acquired timing signal T2.

In accordance with this, when switching between a video signal from the external output non-correspondence video input terminal and a video signal from the external output correspondence video input terminal is performed, an unstable signal state in which a deviation in the timing occurs can be avoided, and input switching can be performed at a high speed.

Next, an operation of the control unit 24 causing the video processing unit 21 to display a video signal input from the external output correspondence video input terminal 12a (hereinafter referred to as a video signal A) using a timing signal T3 generated by the video processing unit 21 will be described.

Here, the timing signal T3 is input to the video processing unit 21 together with a video signal. The video processing unit 21 outputs the timing signal T3 to the control unit 24. Alternatively, the timing signal T3 is input to the video processing unit 21 as a signal included in a video signal. The video processing unit 21 generates a timing signal T3 by extracting the timing signal T3 from the video signal. The video processing unit 21 outputs the extracted timing signal T3 to the control unit 24. Here, the timing signal T3 is a synchronization signal for drawing a video signal (hereinafter referred to as a video signal A), is composed of a vertical synchronization signal and a horizontal synchronization signal, and is a signal from which a resolution, a vertical-direction frequency, a horizontal-direction frequency, and a display type of the video signal can be acquired.

As described above, the control unit 24 displays a video signal input from the external output non-correspondence input terminal 11 on the display unit 23 using the video processing unit 21. When a switching instruction for switching a video signal that is a target to be displayed to a video signal A input from the external output correspondence input terminal 12a is accepted, the control unit 24 causes the video processing unit 21 to perform the process of displaying the video signal A on the display unit 23 using the timing signal T2 supplied from the reception unit 22 (a timing signal corresponding to the video signal A). The video processing unit 21 displays the video signal A on the display unit 23 using the timing signal T2 supplied from the control unit 24 on the basis of an instruction from the control unit 24.

Then, the video processing unit 21 performs signal processing on the video signal A and displaying, and, immediately after switching to the video signal A, although the timing signal T3 cannot be generated or the generated timing signal T3 is a signal that is in an unstable state, when a time of certain degrees elapses after switching, a stable timing signal T3 can be generated on the basis of this video signal A. In other words, the control unit 24 causes the video processing unit 21 to perform the process of displaying the video signal A on the display unit 23 using the timing signal T2 supplied from the reception unit 22 (a timing signal corresponding to the video signal A) and, when the timing signal T3 is generated by the video processing unit 21, causes the video processing unit 21 to perform the process of displaying the video signal A on the display unit 23 using the timing signal T3 generated by this video processing unit 21 instead of using the timing signal T2 supplied from the reception unit 22. At this time, the control unit 24 instructs the reception unit 22 to stop supply of the timing signal T2. The reception unit 22 stops supply of the timing signal T2 to the control unit 24 on the basis of a stop instruction from the control unit 24.

In accordance with this, when a state in which the timing signal T3 can be generated by the video processing unit 21 is formed, the supply of the timing signal T2 from the reception unit 22 to the control unit 24 stops, and thus, the reception unit 22 can be caused not to perform an unnecessary process, and in accordance with this, the load of the display device 10 can be reduced.

Figure 9:
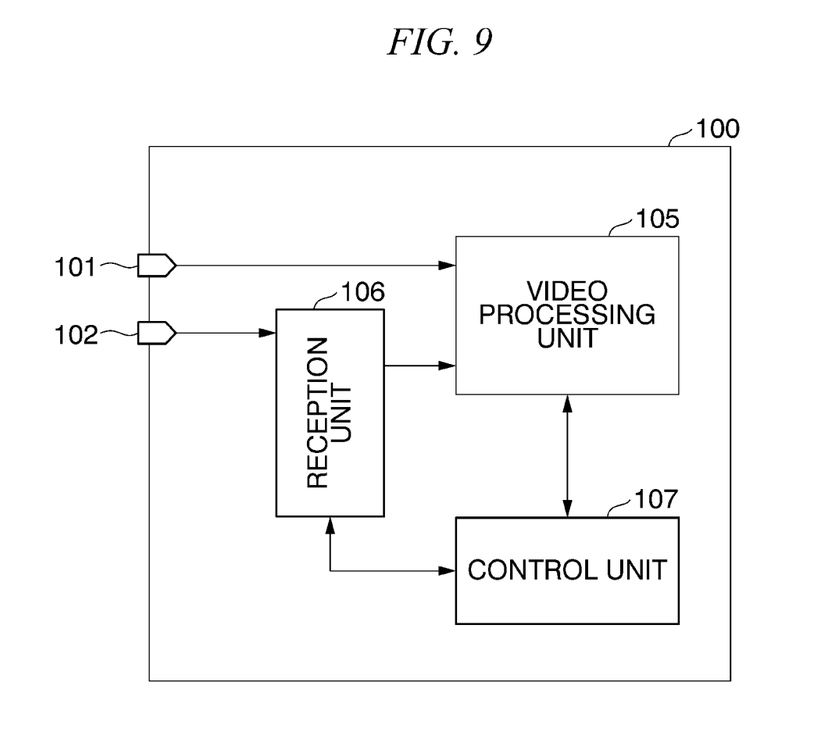
FIG. 9 is a schematic block diagram illustrating a basic configuration of a display device according to the present invention.

FIG. 9 is a schematic block diagram illustrating a basic configuration of a display device according to the present invention. The display device 100 according to the present invention includes a reception unit 106 that receives a video signal input from the external output correspondence input terminal 102 and a timing signal T2 corresponding to the video signal, a video processing unit 105 that performs processing on a video signal input from an external output non-correspondence input terminal 101 and a video signal, which is acquired from the reception unit 106, input from the external output correspondence input terminal 102, and a control unit 107.

In a case in which the process of the high-speed input switching function is performed for switching between a video signal input from the external output non-correspondence input terminal 101 and a video signal input from the external output correspondence input terminal 102, in a state in which a displayed video is based on the video signal input from the external output non-correspondence input terminal 101, and a video signal of non-display input from the external output correspondence input terminal 102 at that time is acquired by the reception unit 106, the control unit 107 acquires a timing signal T2 supplied from the reception unit 106 as a timing signal corresponding to the video signal of non-display.

All or a part of the display device 10 according to the embodiment described above may be realized using a computer. In such a case, a program used for realizing this function may be recorded on a computer-readable recording medium, and the display device may be realized by causing a computer system to read the program recorded on this recording medium and execute the program. A "computer system" described here includes an OS and hardware such as peripherals. In addition, the "computer-readable recording medium" represents a portable medium such as a flexible disc, a magneto-optical disk, a ROM, or a CD-ROM or a storage device such as a hard disk built into a computer system. Furthermore, the "computer-readable recording medium" may include a medium dynamically storing the program for a short time such as a communication line of a case in which the program is transmitted through a network such as the Internet or a communication circuit line such as a telephone line and a medium storing the program for a predetermined time such as an internal volatile memory of the computer system that becomes a server or a client in such a case. In addition, the program described above may be a program used for realizing a part of the function described above or a program that can realize the function described above in combination with a program that is already recorded in the computer system and may be realized using a programmable logic device such as an FPGA.

As above, although the embodiment of the present invention has been described in detail with reference to the drawings, a specific configuration is not limited to this embodiment, and designs and the like in a range not departing from the concept of the present invention are included therein.

REFERENCE SIGNS LIST 10, 100 Display device
11, 101 External output non-correspondence video input terminal
12a to 12d, 102 External output correspondence video input terminal
13, 103 Video output terminal
21, 105 Video processing unit
22, 106 Reception unit
23 Display unit
24, 107 Control unit

What is claimed is:

1. A display device comprising:
a reception unit configured to receive a video signal input from an external output correspondence input terminal and a timing signal corresponding to the video signal;
a video processing unit configured to perform processing on a video signal input from an external output non-correspondence input terminal and the video signal, which has been acquired from the reception unit, input from the external output correspondence input terminal; and
a control unit configured to acquire the timing signal supplied from the reception unit as a timing signal corresponding to a video signal of non-display, wherein a displayed video is based on the video signal input from the external output non-correspondence input terminal, and in a state that the video signal of non-display input from the external output correspondence input terminal is acquired by the reception unit, and in a case of performing a process of a high-speed input switching function for switching between the video signal input from the external output non-correspondence input terminal and the video signal input from the external output correspondence input terminal.

2. The display device according to claim 1, wherein, when a switching instruction for switching to the video signal input from the external output correspondence input terminal is accepted, the control unit causes the video processing unit to perform a process of displaying the video signal input from the external output correspondence input terminal on a display unit using the timing signal corresponding to the video signal, which is supplied from the reception unit, input from the external output correspondence input terminal.

3. The display device according to claim 1, wherein the control unit causes the video processing unit to perform the process of displaying the video signal input from the external output correspondence input terminal on the display unit using the timing signal acquired by the video processing unit in accordance with the processing on the video signal after the video signal input from the external output correspondence input terminal is displayed on the display unit.

4. The display device according to claim 3, wherein, when the video signal is displayed using the timing signal acquired from the video processing unit, the reception unit stops supply of the timing signal to the control unit.

5. The display device according to claim 1, wherein the timing signal comprises a synchronization signal used for drawing the video signal.

6. The display device according to claim 1, wherein the process of the high-speed input switching function comprises a process of performing input switching by taking in one and the other video signals corresponding to the video signal input from the external output non-correspondence input terminal and the video signal input from the external output correspondence input terminal, displaying a screen of the one video signal, setting a screen of the other video signal to be non-display, and performing switching between the displayed screen and the screen of non-display.

7. The display device according to claim 1,
wherein the video signal input from the external output non-correspondence input terminal comprises a video signal not passing through the reception unit, and
wherein the video signal input from the external output correspondence input terminal comprises a video signal passing through the reception unit.

8. The display device according to claim 1, further comprising:
the external output non-correspondence input terminal;
the external output correspondence input terminal; and
a video output terminal configured to output the video signal received by the external output correspondence input terminal to the outside.

9. A method for controlling a display device including: a reception unit configured to receive a video signal input from an external output correspondence input terminal and a timing signal corresponding to the video signal; and a video processing unit configured to perform processing on a video signal input from an external output non-correspondence input terminal and the video signal, which is acquired from the reception unit, input from the external output correspondence input terminal, the method comprising:

acquiring the timing signal supplied from the reception unit as a timing signal corresponding to a video signal of non-display in a state in which a displayed video is based on the video signal input from the external output non-correspondence input terminal, wherein the video signal of non-display input from the external output correspondence input terminal at that time is acquired by the reception unit in a case of performing a high-speed input switching function for switching between the video signal input from the external output non-correspondence input terminal and the video signal input from the external output correspondence input terminal.

10. A display device comprising:

one or more hardware processors;

one or more memories that store processor-executable instructions that are executable by the one or more hardware processors to cause the one or more hardware processors to perform:

receiving a video signal input from an external output correspondence input terminal and a timing signal corresponding to the video signal;

performing processing on a video signal input from an external output non-correspondence input terminal and the video signal, input from the external output correspondence input terminal; and acquiring the timing signal as a timing signal corresponding to a video signal of non-display, wherein a displayed video is based on the video signal input from the external output non-correspondence input terminal, and in a state that the video signal of non-display input from the external output correspondence input terminal is acquired, and in a case of performing a process of a high-speed input switching function for switching between the video signal input from the external output non-correspondence input terminal and the video signal input from the external output correspondence input terminal.

\* \* \* \* \*